(12) United States Patent
Henderson (10) Patent No.: US 8,966,955 B2
(45) Date of Patent: Mar. 3, 2015

(54) HOLLOW CONE DEGASSING

(75) Inventor: Matthew Hay Henderson, Inverbervie (GB)

(73) Assignee: Halliburton Energy Services, Inc., Houston, TX (US)

( * ) Notice: Subject to any disclaimer, the term of this patent is extended or adjusted under 35 U.S.C. 154(b) by 625 days.

(21) Appl. No.: 13/129,838

(22) PCT Filed: Dec. 1, 2008

(86) PCT No.: PCT/US2008/085099
§ 371 (c)(1),
(2), (4) Date: May 18, 2011

(87) PCT Pub. No.: WO2010/065028
PCT Pub. Date: Jun. 10, 2010

(65) Prior Publication Data
US 2011/0219853 A1    Sep. 15, 2011

(51) Int. Cl.
*G01N 33/24* (2006.01)
*B01D 19/00* (2006.01)
*E21B 43/38* (2006.01)

(52) U.S. Cl.
CPC ........ *B01D 19/0052* (2013.01); *B01D 19/0063* (2013.01); *E21B 43/38* (2013.01)
USPC .......................................... 73/19.09; 96/155

(58) Field of Classification Search
CPC .......................................................... B01D 19/00
USPC ............. 73/19.01, 19.04, 19.09, 19.1, 19.12, 73/863.71, 863.81; 95/260, 261, 258; 96/155, 204, 213, 214, 217, 219
See application file for complete search history.

(56) References Cited

U.S. PATENT DOCUMENTS

| | | | | |
|---|---|---|---|---|
| 3,973,930 A | * | 8/1976 | Burgess | 95/261 |
| 4,362,536 A | * | 12/1982 | Gullichsen | 95/261 |
| 4,365,977 A | * | 12/1982 | Egbert | 95/248 |
| 4,416,672 A | * | 11/1983 | Underwood | 96/213 |
| 5,254,145 A | * | 10/1993 | Denece et al. | 96/217 |
| 6,389,878 B1 | * | 5/2002 | Zamfes | 73/19.09 |
| 6,391,094 B2 | | 5/2002 | Ramos | |
| 6,464,758 B1 | * | 10/2002 | Hoferer | 95/261 |
| 7,032,444 B2 | | 4/2006 | Breviere et al. | |
| 7,537,644 B2 | * | 5/2009 | Park et al. | 95/261 |

(Continued)

OTHER PUBLICATIONS

Cook et al., Spinning Cones as Pumps, Degassers and Level Controllers in Mechanically Stirred Tanks—Chemical Engineering Research and Design p. 719-729, Jun. 2004.*

(Continued)

*Primary Examiner* — Hezron E Williams
*Assistant Examiner* — Hoang Nguyen
(74) *Attorney, Agent, or Firm* — Howard L. Speight (57) ABSTRACT

A degassing system includes a vessel. A liquid inlet lets liquid into the vessel. A liquid outlet lets liquid out of the vessel. A liquid receiving chamber receives the liquid that enters the vessel through the liquid inlet. The liquid receiving chamber is open on one side. The degassing system further includes a motor having a shaft and a pump coupled to the shaft. The pump has the shape of a cone. The cone has an axis, a narrow end and a wide end. The pump is positioned so that its narrow end is inserted into the open side of the liquid receiving chamber and so that its wide end is close enough to a wall of the vessel so that fluid ejected from the wide end when the pump is spinning will strike the wall. The degassing system includes a gas outlet for releasing gas from the vessel.

19 Claims, 9 Drawing Sheets

(56) References Cited

U.S. PATENT DOCUMENTS

| | | | |
|---|---|---|---|
| 7,779,667 B2 * | 8/2010 | Evrard | 73/19.09 |
| 7,879,140 B2 * | 2/2011 | Kesti et al. | 95/248 |
| 7,935,179 B2 * | 5/2011 | Vatanen et al. | 95/261 |
| 8,231,714 B2 * | 7/2012 | Cornet et al. | 95/258 |
| 2006/0254421 A1 * | 11/2006 | Boone | 95/260 |
| 2007/0256561 A1 | 11/2007 | Ooya | |

OTHER PUBLICATIONS

Cook et al., Spinning Cones as Pumps, Degassers and Level Controllers in Mechanically Stirred Tanks—Chemical Engineering U Research and Design p. 719-729, Jun. 2004.*

Cooke et al., Spinning Cones As Pumps, Degassers and Level Controller in Mechanically Stirred Tanks, Chemical Engineering Research and Design, 82(A6): 719-729; Institution of Chemical Engineers, Jun. 2004.*

Makarytchev, S. V., et al., "Thickness and velocity of wavy liquid films on rotating conical surfaces", *Chemical Engineering Science* 56 (2001) 77-87, (2001).

Cooke, M. et al., "Spinning Cones as Pumps, Degassers and Level Controllers", 1-19, ( Jun. 2004).

"Search Report and Written Opinion", PCT/US2008/85099, (Jan. 29, 2009).

"Notification of Transmittal of International Preliminary Report on Patentability", PCT/US08/85099, (Apr. 28, 2011).

* cited by examiner

HOLLOW CONE DEGASSING

BACKGROUND

Drilling mud sometimes absorbs gas from formations exposed in a well bore hole as it is being circulated to the surface. Information about the formations and the hydrocarbons and other substances that they contain can sometimes be learned by extracting the gas from the drilling mud and analyzing the extracted gas.

DETAILED DESCRIPTION

Figure 1:
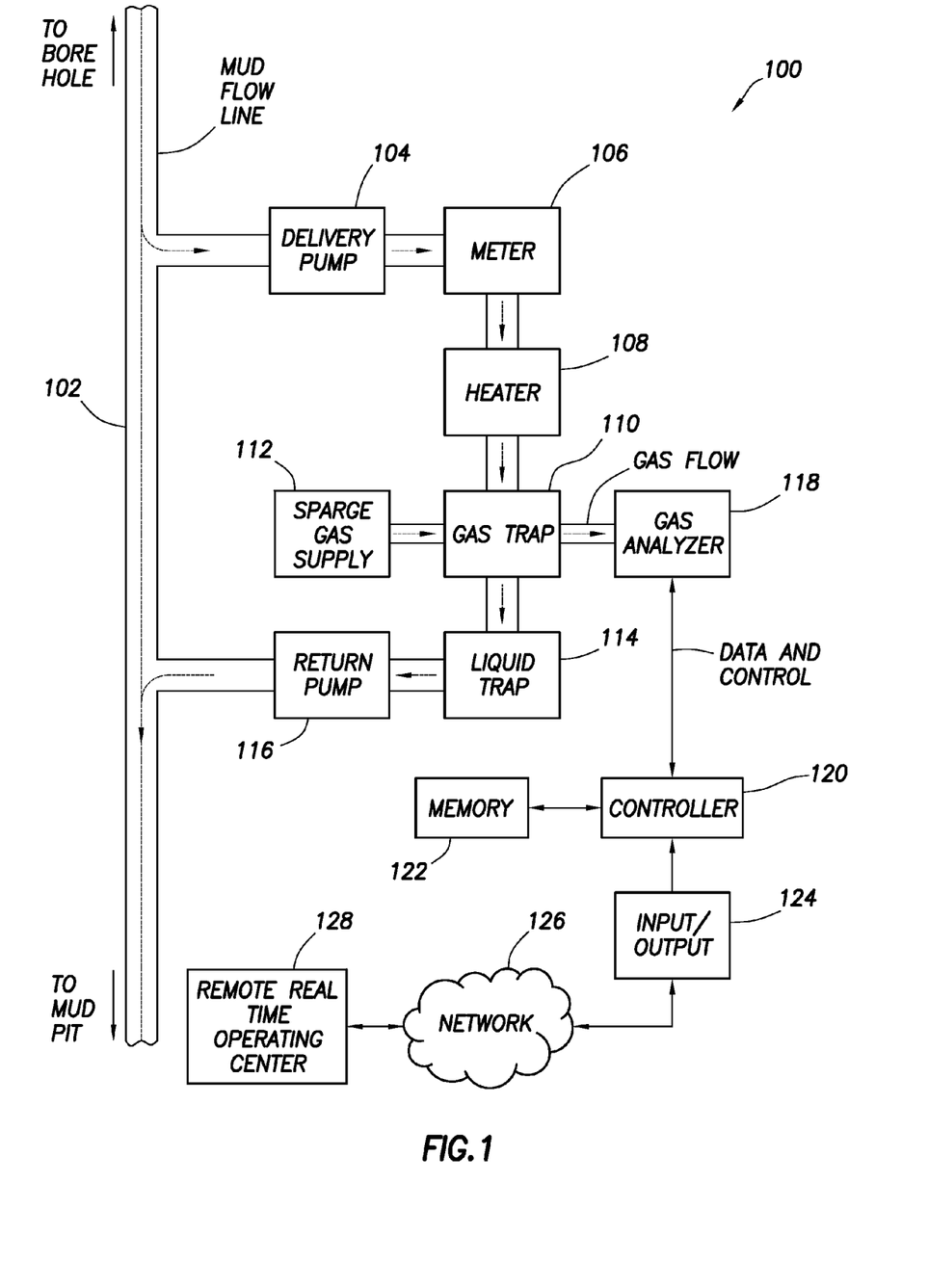
FIG. 1 is a block diagram of one embodiment of a system for extracting and analyzing the gas from drilling mud.

One embodiment of a system 100, shown in FIG. 1, extracts drilling mud as it flows from the well bore hole to a mud pit through a mud flow line 102 in a drilling system. In other embodiments, the drilling mud is intercepted from other parts of the drilling mud circulatory system, such as inside the well bore or between the mud pit and a drill string being used to drill a well. In one embodiment, the system 100 is incorporated in a Measurement While Drilling or Logging While Drilling drilling system. In one embodiment, the system 100 is incorporated in a drilling system that uses wired drillpipe or coiled tubing (wired and/or unwired). In one embodiment, the system 100 is downhole as part of the drill string.

In one embodiment, a delivery pump 104 pumps drilling mud from the mud flow line 102. In one embodiment, the delivery pump 104 produces a constant reliable volume of drilling mud from the mud flow line 102 into the system. In one embodiment, the delivery pump 104 includes a peristaltic pump.

In one embodiment, a meter 106 measures the volume of drilling mud that has been extracted from the mud flow line 102 by the delivery pump 104. In one embodiment, a heater 108 heats the mud from the meter 106 to a constant mud temperature. In one embodiment, the constant mud temperature is selected to liberate hydrocarbon gasses, such as Alkanes (C1 Methane through the hydrocarbon range to C12 Dodecane), Aromatics such as Benzene and Toluene, and Olefins such as Ethene (Acetylene) and Mercaptans. In one embodiment, the heater heats the mud to a temperature of approximately (i.e., within 10 percent of) 80 degrees Centigrade.

In one embodiment, the mud from the heater 108 is sent to a gas trap 110, described in more detail below, which extracts gas from the drilling mud. In one embodiment, a sparge gas supply 112 is coupled to the gas trap to introduce an inert gas, such as nitrogen, into the gas trap. In one embodiment, the gas trap 110 produces a gas output and a liquid output. In one embodiment, the liquid output is sent to a liquid trap 114. In one embodiment, a return pump 116 pumps the liquid out of the liquid trap 114 and back into the mud flow line 102. In one embodiment, as shown below, the liquid trap 114 is part of the gas trap 110.

In one embodiment, the gas output of the gas trap 110 is sent to a gas analyzer 118, which analyzes the components of the gas output. In one embodiment, the gas analyzer 118 reports its results to a controller 120, which also receives data from the meter 106. In one embodiment, the controller 120 uses this data to compute the volume of gas per volume of drilling mud, which can be used to draw conclusions about the formations exposed in the bore hole.

In one embodiment, the controller 120 is a special purpose computer programmed to perform the functions described herein. In one embodiment, the controller 120 is coupled to a memory 122. In one embodiment, the memory 122 contains the programs to be executed as the controller 120 performs its functions as well as constants and variables used to perform those functions. In one embodiment, the controller 120 is coupled to one or more input/output devices 124, such as a keyboard, a mouse, a monitor or display, a speaker, a microphone, or a network interface. In one embodiment, the controller 120 is coupled to a network 126, such as a local area network or the Internet, through one or more of the input/output devices 124. In one embodiment, the controller 120 is coupled to a remote real time operating center 128 through the input/output devices 124 and the network 126, allowing the remote real time operating center 128 to control and receive data from the controller 120.

In one embodiment, the controller 120 receives data from and controls other elements of the system 100 including:
  displaying and/or controlling the delivery pump 104 flow rate;
  displaying and/or controlling the heater 108 temperature;
  displaying and/or controlling the return pump 116 flow rate;
  displaying and/or controlling the blow back rate;
  displaying the density, flow rate, and temperature of the drilling mud measured by the meter 106;
  displaying the gas trap 110 temperature;
  displaying and/or controlling the gas trap 110 rotation rate (as discussed below);
  displaying and/or controlling the liquid trap 114 temperature.

In one embodiment, a user interface, such as a graphical user interface ("GUI") is provided by which the control and data information can be displayed and modified.

In one embodiment of the gas trap 110, illustrated in detail in FIGS. 2A-F, a degassing vessel 202 is coupled to a condenser chamber 204. A fluid inlet 206 provides an entrance for drilling mud from the heater 108. A fluid outlet 208 provides an exit for drilling mud from the gas trap 110. A sparge gas inlet 210 permits the introduction of sparge gas into the degassing vessel 202. A gas sample outlet 212 provides a vent for the sparge gas and gas released from the drilling mud. A temperature well 214 allows the insertion of a temperature sensor to monitor the temperature of the drilling mud in the degassing vessel. A sump drain 216 provides a port through which the degassing vessel 202 can be drained. The degassing vessel 202 includes two parts which are held together by latches 218. The upper part can be removed to allow the degassing vessel to be cleaned and/or serviced.

The gas trap 110 further includes a purge gas test port 220, which, in one embodiment is used to introduce purge gas prior to spinning in the cone (as a test) to establish effectiveness of purge gas introduction prior to degassing. In one embodiment, the purge gas test port 220 is used as a temperature well for measuring the temperature of drilling mud introduced into the degassing vessel 202 through the fluid inlet 206. The gas trap 110 further includes mounting legs 222 to allow it to be mounted to a skid or to another piece of equipment at a drilling location. The gas trap 110 further includes a sight glass to allow inspection of the inside of the degassing vessel 202 without disassembly and/or while the gas trap 110 is in operation.

In one embodiment, the gas trap 110 includes an air motor 226, which is driven by compressed air. In one embodiment, the air motor 226 includes two air motor direction ports 228, 230. Injecting compressed air into one of the air motor direction ports 228 causes the air motor 226 to rotate in one direction. Injecting compressed air into the other air motor direction port 230 causes the air motor 226 to rotate in the opposite direction. In one embodiment, the speed of the air motor 226 is controlled by the controller 120. In one embodiment, the speed of the air motor 226 is controlled by controlling the pressure of the compressed air injected into the air motor direction ports 228.

In one embodiment, the gas trap 110 includes an RPM sensor 232 coupled to the air motor 226. In one embodiment, the RPM sensor 232 measures the speed of rotation of the air motor 226 and reports it to the controller 120.

In one embodiment, the gas trap 110 includes a flooding detector 234, which detects fluid within the condenser chamber 204 and reports it to the controller 120. In one embodiment, upon sensing a flood condition, the controller 120 shuts down the delivery pump 104 until the flooding condition ceases. In one embodiment, the controller 120 uses the occurrence of flooding conditions as one of the factors to set the speed of rotation of the air motor 226.

Figure 2A:
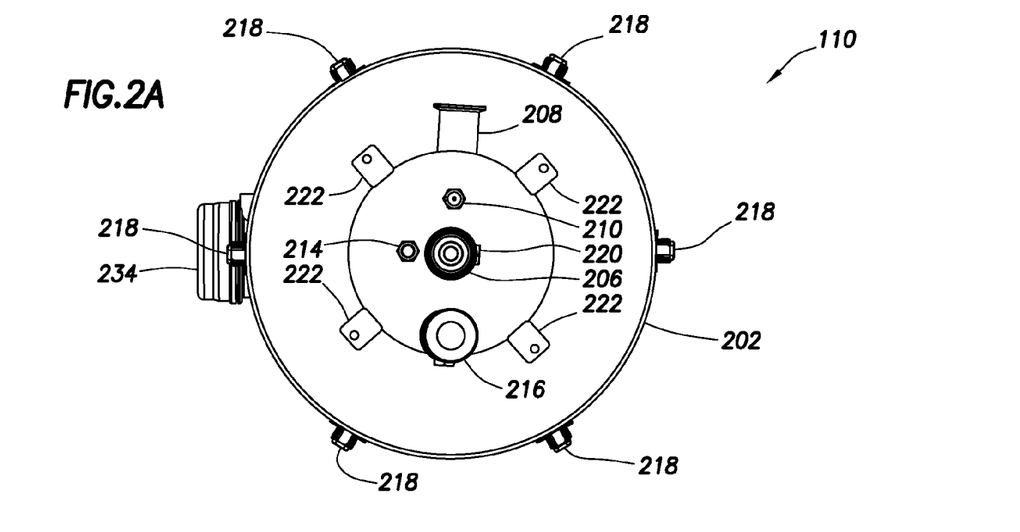
FIG. 2A is a bottom plan view of one embodiment of a gas trap.
Figure 2B:
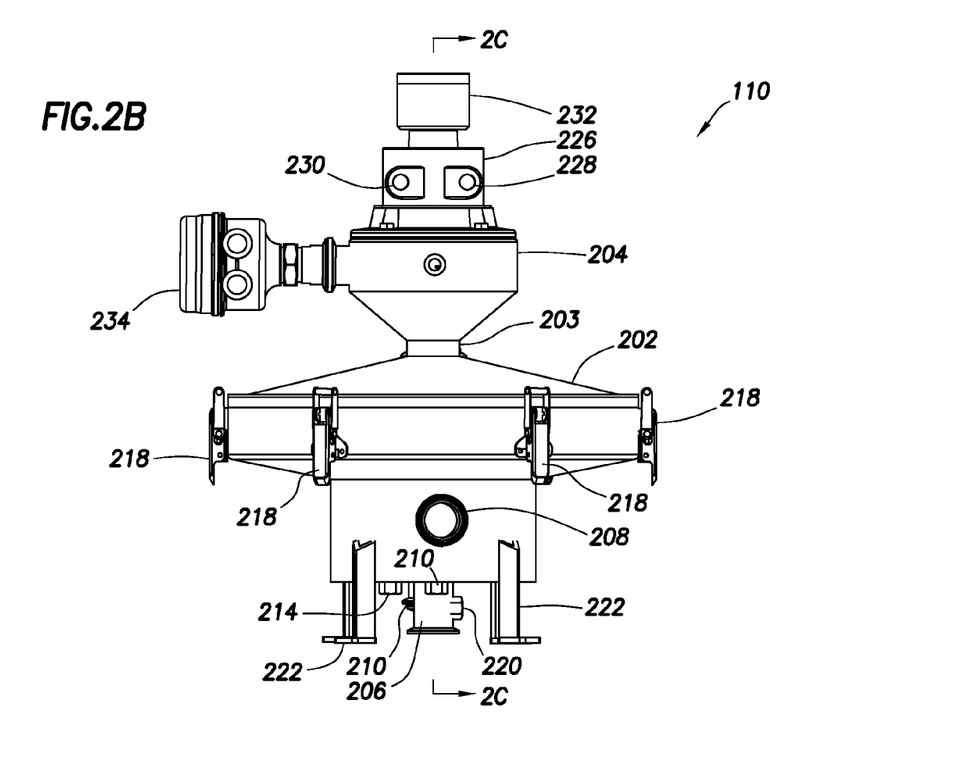
FIG. 2B is a side plan view of one embodiment of a gas trap.
Figure 2C:
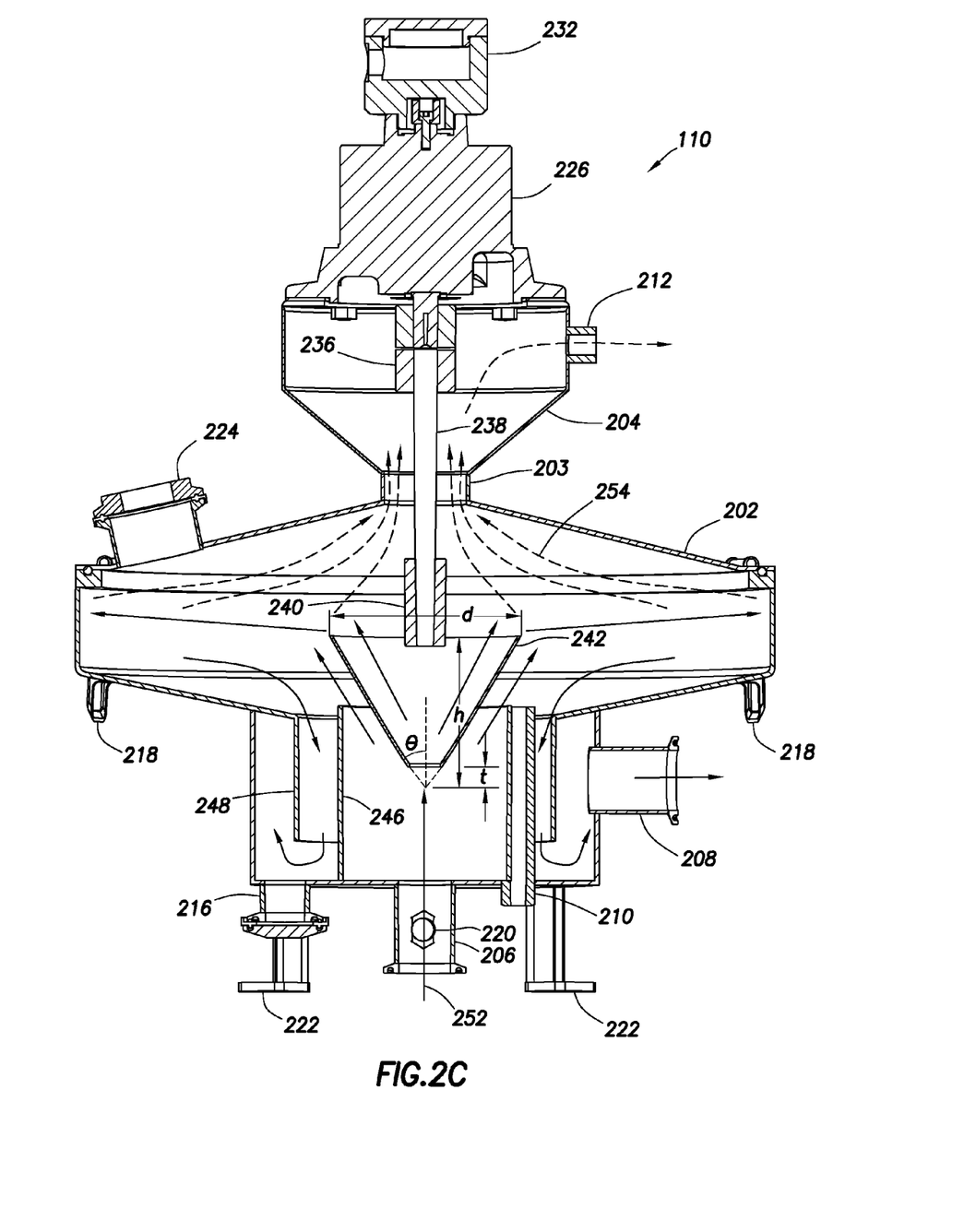
FIG. 2C is a cutaway view of one embodiment of a gas trap.
Figure 2D:
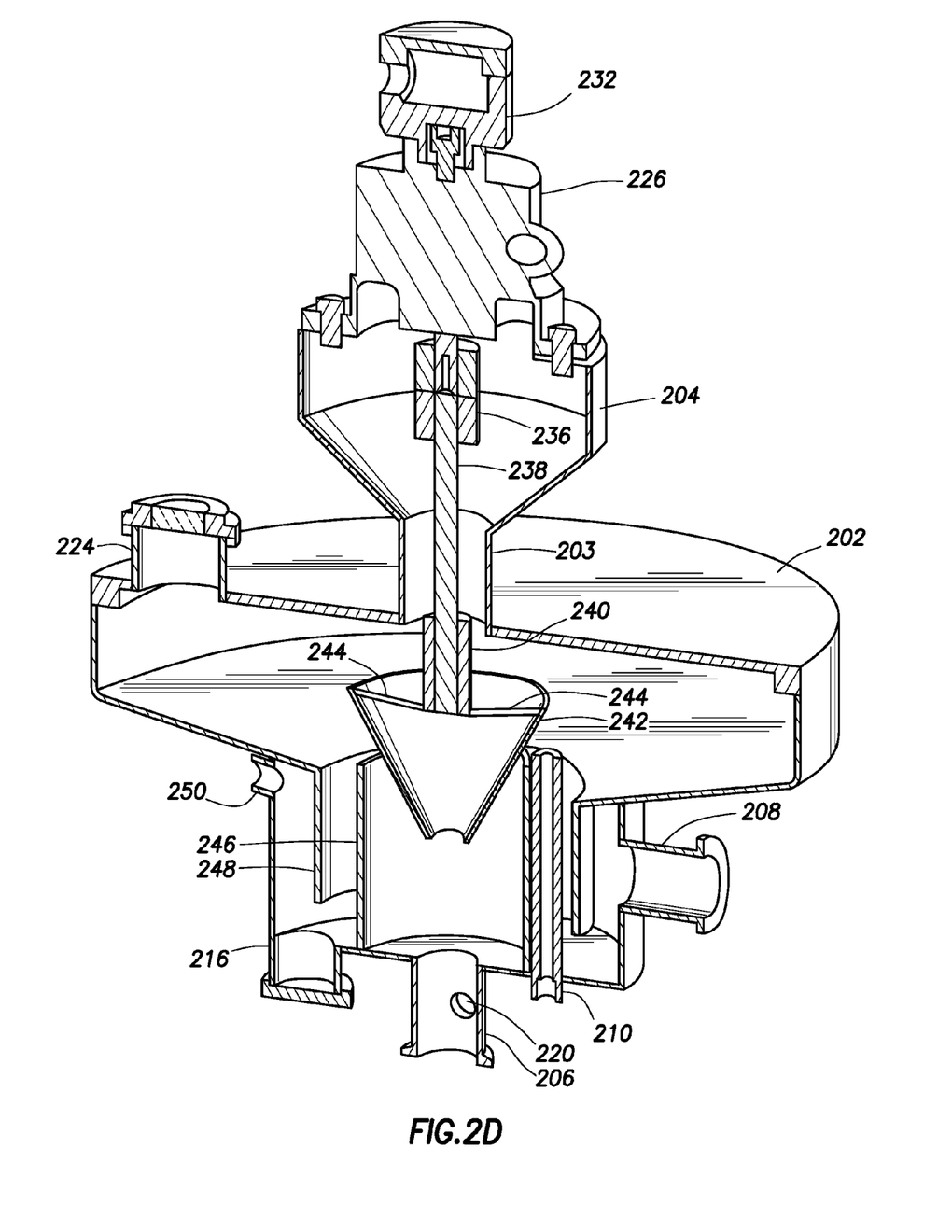
FIG. 2D is a perspective cutaway view of one embodiment of a gas trap.
Figure 2E:
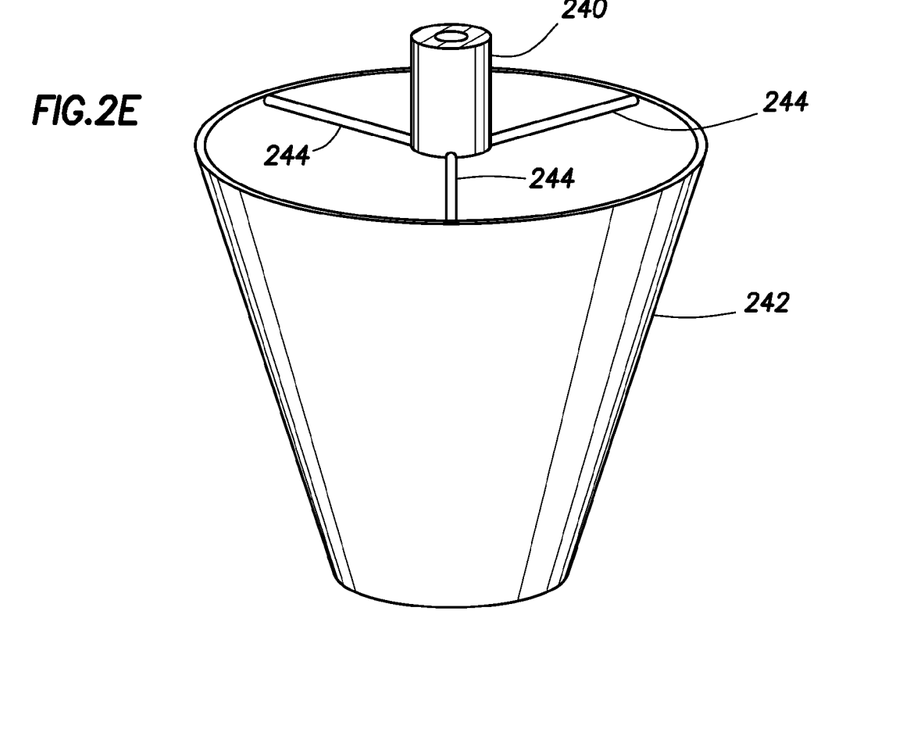
FIG. 2E is a perspective view of one embodiment of the structure used to mount a cone to a shaft.

In one embodiment, a motor shaft coupling 236 couples the shaft of the air motor 226 to a shaft 238. In one embodiment, a cone coupling 240 couples a cone 242 to the shaft 238. In one embodiment, the dimensions of the cone coupling 240 are 14 mm inside diameter, 25 mm outside diameter, and 50 mm long. The cone coupling 240 is secured to the cone by three 5 mm rods or spokes 244. In one embodiment, the spokes 244 are welded to the lower part of the coupling 240 and to the wide end of the inner side of the cone. In one embodiment, the shaft 238 passes through the coupling 240 and is flush with the lower end of the coupling 240. In one embodiment, the shaft is locked to the coupling by 5 mm grub screws.

In one embodiment, the cone 242 has the shape of a truncated hollow cone. In one embodiment, the cone 242 has the shape of a right circular cone. That is, the cone is the solid figure bounded by a substantially planar base and the locus of all straight line segments from a substantially circular perimeter (i.e., within 10 percent of a radius) on the base to an apex located on an axis substantially perpendicular (i.e., within 10 degrees) to the plane and substantially through the center (i.e., within 10 percent of a radius) of the circle on the plane. A hollow cone is defined to be a cone that has a hole along the axis. In one embodiment, the hollow cone is a shell in a cone shape. In one embodiment, a truncated hollow cone is a hollow cone with a portion of the apex end of the cone removed, as shown in FIGS. 2C and 2D.

In one embodiment, the hollow truncated cone has a diameter "d," a height "h" (the height of the cone before truncation) and a truncation distance "t" (i.e., the amount of the apex end of the cone that was truncated). In one embodiment, $h-t=90$ mm.

In one embodiment, $80$ mm$<h-t<110$ mm.

In one embodiment, $50$ mm$<h-t<150$ mm.

In one embodiment:

the cone angle($\theta$)=30 degrees

In one embodiment:

$20$ degrees$<=\theta<=40$ degrees.

In one embodiment:

$10$ degrees$<=\theta<=60$ degrees.

In one embodiment, the cone 242 is not a right circular cone. That is, in this embodiment, the axis is not perpendicular to the plane and/or the perimeter is not circular.

Figure 2F:
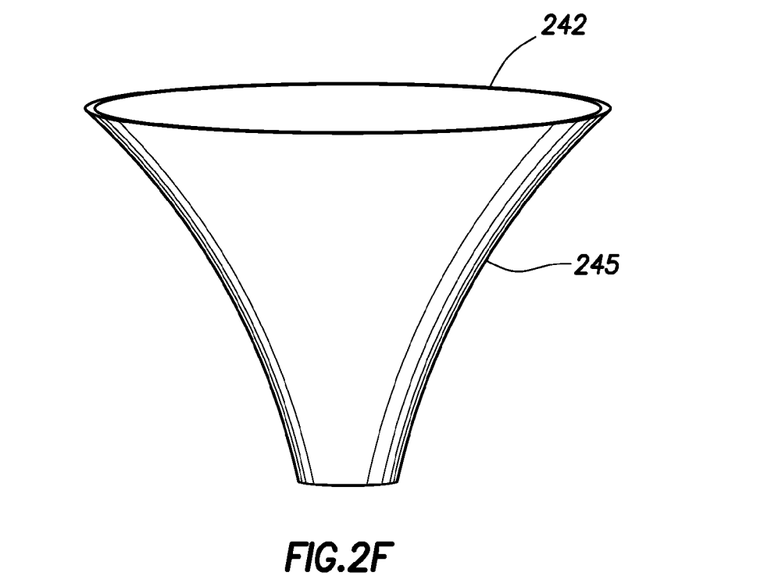
FIG. 2F illustrates a curved cone.

In one embodiment, illustrated in FIG. 2F, the side 245 of the cone 242 is not linear and follows a non-linear curve, such as a parabola, a hyperbola, or a more complex curve, or it follows a curve with discontinuities, such as a saw-tooth imposed on a line.

In one embodiment, an actuator (not shown) permits the cone 242 to be raised and lowered along its axis under the control of the controller 120.

In one embodiment, a weir wall 246 forms a weir (or "liquid receiving chamber") around the narrow end of the cone 242. In one embodiment, fluid entering the degassing vessel 202 through the fluid inlet 206 may rise to the level of the top of the weir wall 246 before spilling over. As a result, the level of the drilling mud on the cone will be kept below the level of the top of the weir wall 246.

In one embodiment, a liquid trap skirt 248 extends below the top edge of the weir wall 246. As long as the fluid level within the degassing vessel 202 is above the bottom edge of the liquid trap skirt 248, gas will be prevented from escaping through the fluid outlet 208.

In one embodiment, an atmospheric pressure vent 250 prevents gas from building up in the liquid trap area of the degassing vessel. In one embodiment, the atmospheric pressure vent 250 also provides a release for fluid, maintaining the fluid level in the degassing vessel below the top edge of fluid outlet 208.

The fluid paths and gas paths in the gas trap 110 are shown by solid arrows 252 and dashed arrows 254, respectively, in FIG. 2C. In one embodiment, fluid enters through the fluid inlet 206 and enters the weir bounded by the weir wall 246. In one embodiment, the cone 242 is partially submerged in the fluid to a level no higher than the weir wall 246. In one embodiment, the cone 242 is spun by the air motor 226 and acts as a pump, causing the fluid to rise along the outside and inside surfaces of the cone 242. In one embodiment, the cone 242 is spun at 1500-2500 RPM. In one embodiment, the cone 242 is spun at 1000-3000 RPM. In one embodiment, the cone 242 is spun at 5-4000 RPM. In one embodiment, the cone rotates at a speed to maintain a fluid level in the liquid receiving chamber between 25 mm and 30 mm above the narrow end of the pump 242. In one embodiment, the cone rotates at a speed to maintain a fluid level in the liquid receiving chamber between 15 mm and 50 mm above the narrow end of the pump 242. In one embodiment, the cone rotates at a speed to maintain a fluid level in the liquid receiving chamber between 5 mm and 100 mm above the narrow end of the pump 242.

The spinning of cone 242 causes fluid to be ejected from the top edge of the cone 242. The fluid runs down the inside surface of the degassing vessel and into the space between the weir wall 246 and the liquid trap skirt 248. It then exits through the fluid outlet.

Throughout this process, gas is released from the fluid. In one embodiment, the gas rises from the degassing vessel 202, through a neck 203 and into the condenser chamber 204. In one embodiment, the degassing vessel 202 is at a higher temperature than the condenser chamber 204 because the fluid is heated by the heater 108 before it enters the degassing vessel 202. As a result, in one embodiment, fluid condenses in the condenser chamber 204 and flows through the neck 203 into the degassing vessel 202. Gas exits the condenser chamber 204 through the gas sample outlet 212.

The release of gas from the fluid is facilitated by the action of the spinning cone 242. The spinning cone pumps fluid up the outer surface and the inner surface of the cone, as shown in FIG. 2C. The operation of a spinning cone is described in M. Cooke, P. J. Heggs, A. Eaglesham, D Housley, Spinning Cones as Pumps, Degassers and Level Controllers, Trans IChemE, Part A, June 2004, Chemical Engineering Research and Design, 82(A6): 719-729 (hereinafter "Cooke Paper"). According to the Cooke Paper, the cone "picks up liquid from a pool at the inlet, accelerates it as a thin film up the walls and ejects it as a radial sheet at the top." Cooke Paper at 719.

The film of fluid thins as it moves up the surface of the cone 242 because the same amount of fluid is covering a larger surface area. This thinning facilitates the release of gas from the fluid.

In addition, the fluid is subjected to forces similar to those experienced in a centrifuge. Under these forces gas tends to separate from the fluid because the gas and the fluid have different weights.

Further, the fluid ejected from the edge of the cone forms a film that disintegrates under processes described in the Cooke paper:

Disintegration by direct drop formation: At low pumping rates a liquid torus is formed close to the edge of the cone. The diameter of the torus is determined by the liquid properties (density, viscosity and surface tension). External disturbances cause the torus to become varicosely deformed. Droplets are formed at the various bulges on the torus and are flung off by centripetal force.

Disintegration by ligament formation: At intermediate pumping rates, the bulges in the torus become more pronounced and the liquid leaves the cone in the form of thin jets or ligaments. If the pumping rate is gradually increased, the number of ligaments increases until a critical value is reached. If the pumping rate is increased further, the thickness of the ligaments increases but the number of ligaments remains constant. The ligaments flung from the cone are unstable and break up into drops some distance away from the edge of the cone.

Disintegration by film formation: The torus disappears at high pumping rates and a continuous sheet of liquid is flung from the edge of the cone. This sheet extends a small distance from the edge and then breaks chaotically into ligaments that in turn break into drops. Dombrowski and Lloyd divide this mode of disintegration into two separate categories that they call "aerodynamic wave disintegration" and "turbulent disintegration". In the former the sheets break up into drops within a narrow radial band whereas in the latter disintegration takes place over a relatively large distance. From their experiments it appears that, for a given pumping rate, the break up category, either aerodynamic or turbulent, depends solely on the speed of the cone periphery. Cooke paper at 720 (citations omitted).

These disintegration forces further facilitate the release of gas from the fluid.

Figure 3:
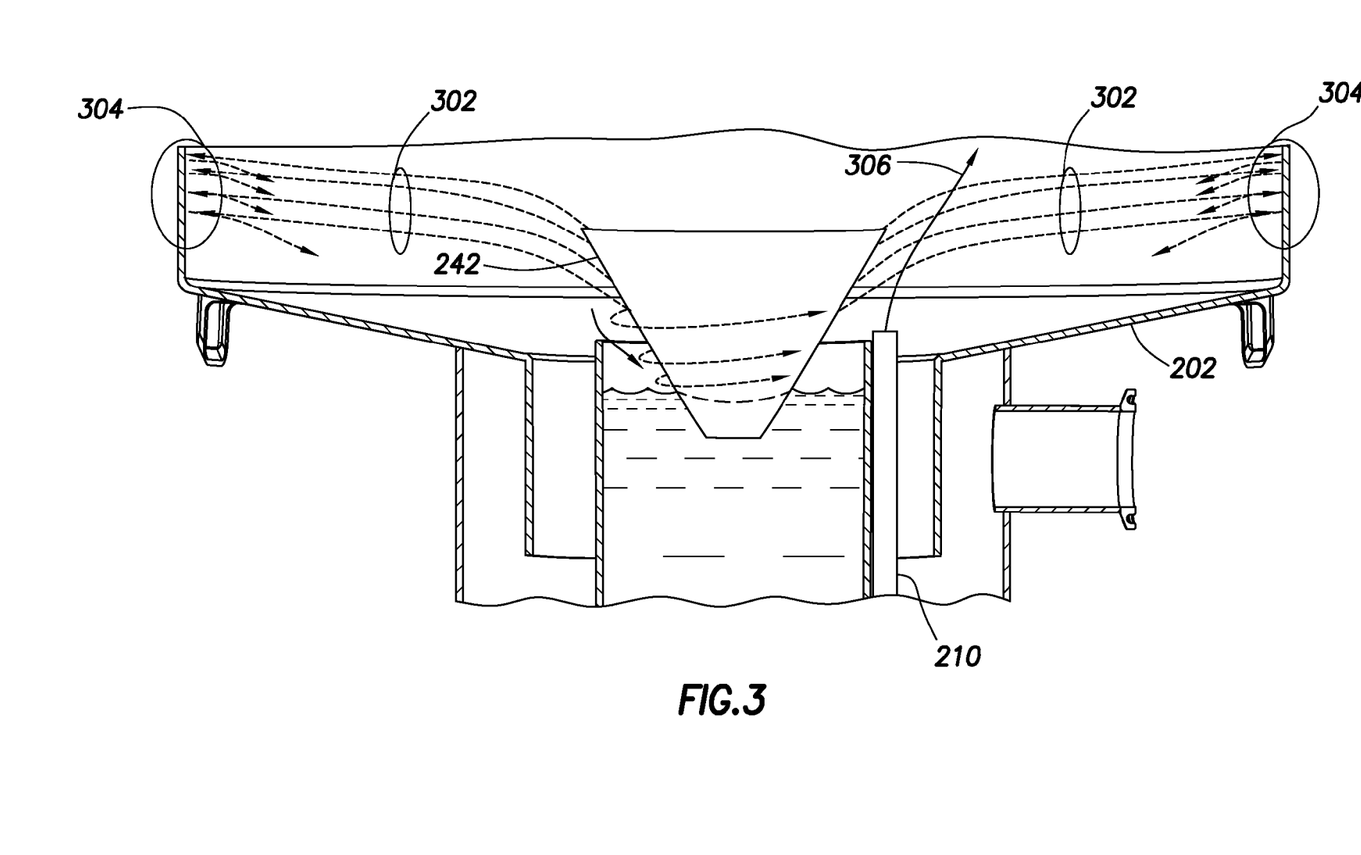
FIG. 3 illustrates the operation of a hollow cone in one embodiment of a gas trap.

Still further, the cone 242 is situated within the degassing vessel 202, as shown in FIG. 3, so that fluids 302 ejected from the edge of the cone strike the side 304 of the degassing vessel 202 and expend kinetic energy imparted to the fluid as it was pumped up the side of the cone 242. This release of kinetic energy further facilitates the release of gas from the fluid 302.

Still further, the sparge gas inlet 210 is situated so that sparge gas 306 is directed through the fluids 302 ejected from the edge of the cone, disrupting the flow of the fluid 302 and further facilitating the release of gas from the fluid 302. The sparge gas 306 also carries gas released by the fluid to the gas sample outlet 212.

Figure 4:
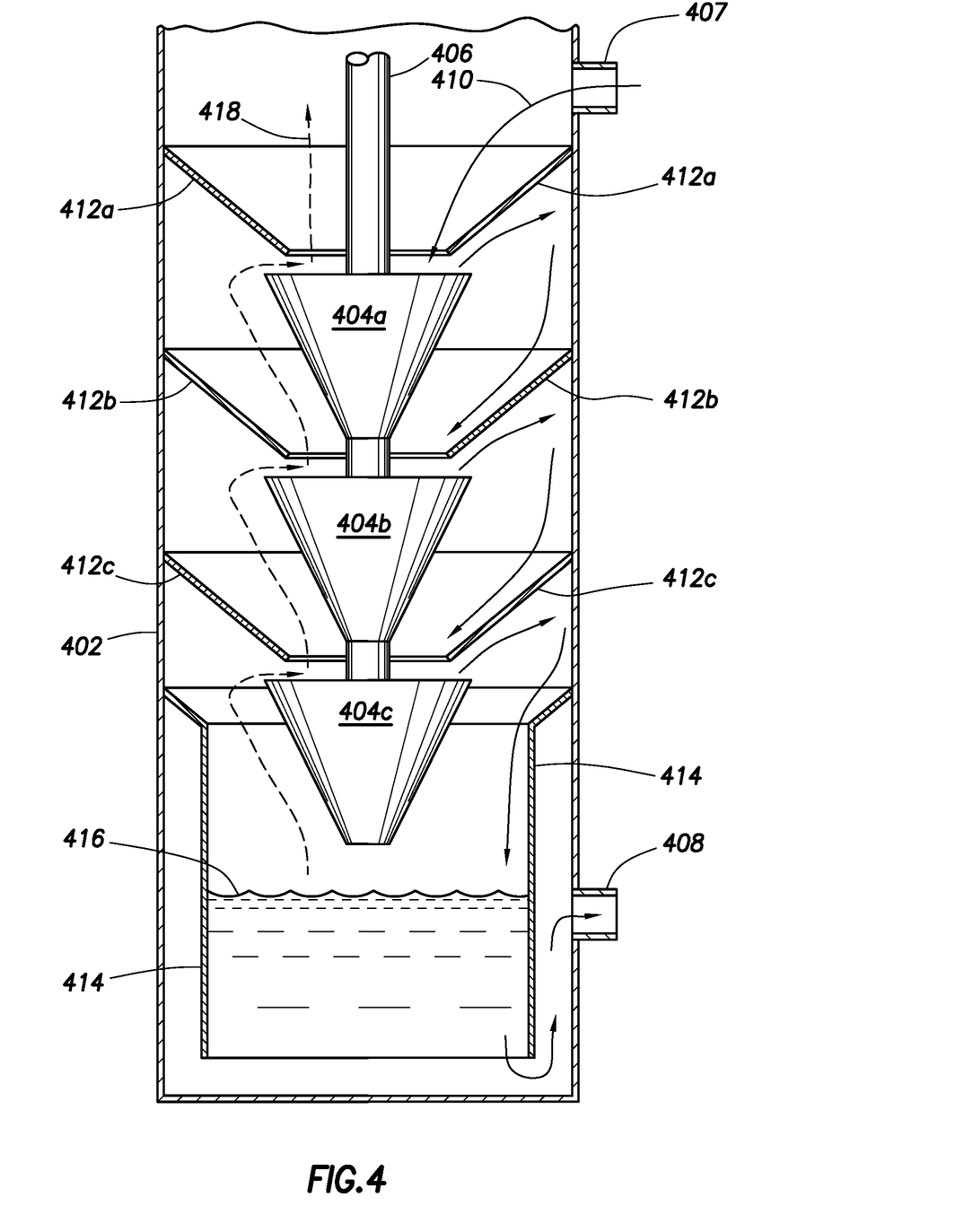
FIG. 4 is a cutaway view of a stacked cone embodiment of a gas trap.

One embodiment of degassing vessel 402, a greatly simplified version of which is shown in FIG. 4, includes a stack of spinning cones 404*a-c* coupled to a rotating shaft 406. In one embodiment, spinning cones 404*a* and 404*b* are hollow, truncated cones that are closed at their narrow ends by the shaft 406. In one embodiment, spinning cone 404*c* is mounted to the shaft 406 in the same way that the cone 242 is shown mounted to the shaft 238 in FIGS. 2D and 2E. In one embodiment, spinning cone 404*c* is mounted to the shaft in the same way as described above for spinning cones 404*a* and 404*b*. In one embodiment, the axes of the spinning cones 404*a-c* are substantially collinear and substantially parallel, i.e. parallel within 10 degrees. While FIG. 4 shows three stacked cones 404*a-c*, it will be understood that any number of cones could be used.

In one embodiment, fluid enters the degassing vessel 402 through a fluid inlet 407 and exits through a fluid outlet 408. The path of the fluid through the degassing vessel 402 is shown by a set of solid lines 410. In one embodiment, a series of fixed non-rotating cones 412*a*, 412*b*, and 412*c* are coupled to the walls of the degassing vessel 420 as shown in FIG. 4. In one embodiment, upon entering the degassing vessel 402, the fluid either flows directly into the interior of the cone 404*a* or it flows down the upper surface of fixed cone 412*a* into the interior of the cone 404*a*. In one embodiment, the fluid is acted on by the forces described above and flows up the inside of spinning cone 404*a*. In one embodiment, the fluid is ejected at the edge of the cone 404*a* and strikes the underside of fixed cone 412*a* and the wall of the degassing vessel 402, resulting in the release of gas from the fluid under the mechanisms described above.

In one embodiment, the fluid then flows down the wall of the degassing vessel 402 and along the upper surface of the fixed cone 412*b* into the interior of spinning cone 404*b*. In one embodiment, the fluid is acted on by the forces described above and flows up the inside of fixed cone 404*b*. In one embodiment, the fluid is ejected at the edge of the cone 404*b* and strikes the underside of fixed cone 412*b* and the wall of the degassing vessel 402, resulting in the release of gas from the fluid under the mechanisms described above.

In one embodiment, the fluid then flows down the wall of the degassing vessel 402 and along the upper surface of the fixed cone 412*c* into the interior of spinning cone 404*c*. In one embodiment, the fluid is acted on by the forces described above and flows up the inside of fixed cone 404*c*. In one embodiment, the fluid is ejected at the edge of the cone 404*c* and strikes the underside of fixed cone 412*c* and the wall of the degassing vessel 402, resulting in the release of gas from the fluid under the mechanisms described above.

In one embodiment, the fluid then flows down the wall of the degassing vessel 402 and along a liquid trap skirt 414 to form a pool 416 at the bottom of the degassing vessel 402. In one embodiment, Once the level of the pool 416 rises above the bottom edge of the fluid outlet 408, the fluid flows out of the degassing vessel 402 through the fluid outlet 408. In one embodiment, if the level of the pool rises to the point where spinning cone 404c is partially submerged, fluid rises along the inside surface and the outside surface of spinning cone 404c as shown in FIG. 2C, further facilitating the release of gas from the fluid. In one embodiment, if the level of the pool 416 rises above the bottom edge of the liquid trap skirt 414, gas cannot escape from the degassing vessel through the fluid outlet 408.

In one embodiment, the flow of gas within the degassing vessel 402 is shown by dashed line 418. The actions of each of the cones 404a-c causes gas to be released. In one embodiment, the gas flows up through a neck 203, into a condensor chamber 204, and through a gas sample outlet. Sparge gas can be introduced into the degassing vessel at any point where it can disrupt the flow of fluid, thereby facilitating the release of gas from the fluid, and/or facilitate the flow of gas released from the fluid.

Figure 5:
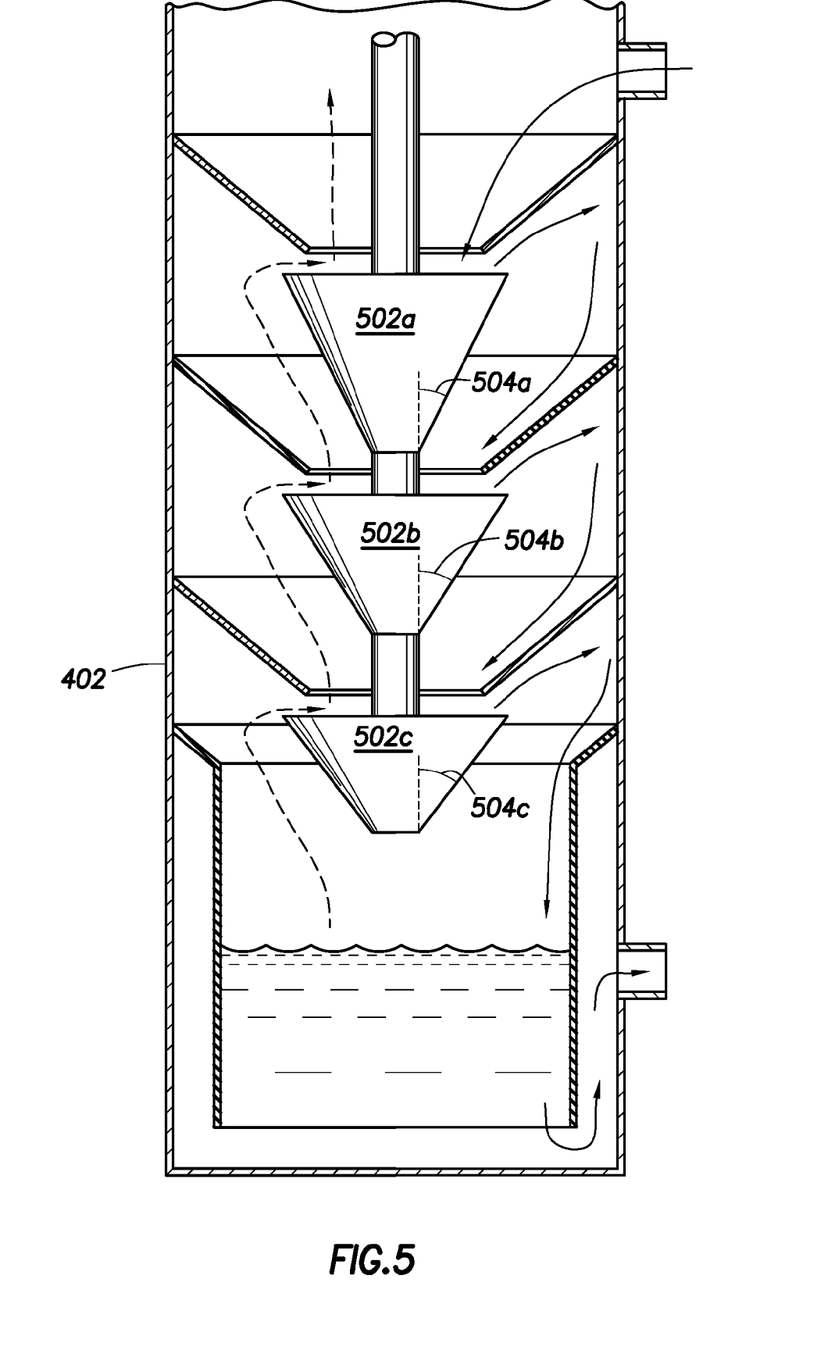
FIG. 5 is a cutaway view of a stacked cone embodiment of a gas trap in which the stacked cones have different cone angles.

In one embodiment, illustrated in FIG. 5, the degassing vessel is configured as shown in FIG. 4 except that the spinning cones 502a-c have different cone angles and the spacing between the spinning cones 502a-c and fixed cones 404a-c is adjusted accordingly. In one embodiment, spinning cone 502a has a smaller cone angle 504a than the cone angle 504b of the spinning cone 502b, which in turn is smaller than the cone angle 504c of the spinning cone 502c.

Figure 6:
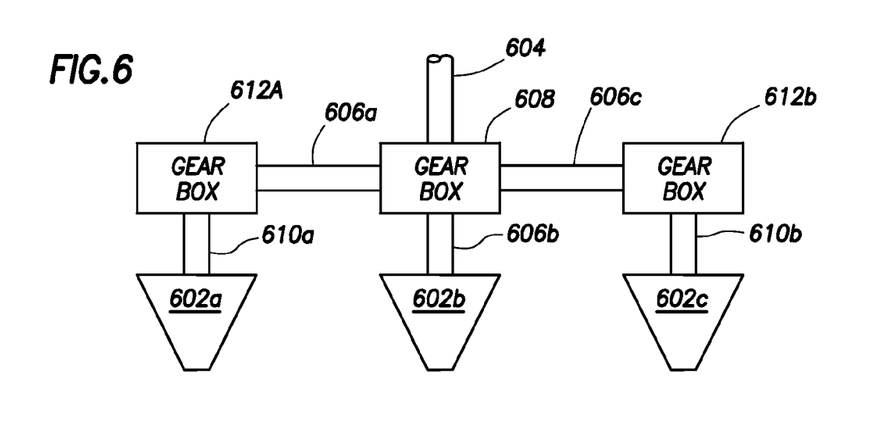
FIG. 6 is a cutaway view of a gas trap with multiple cones distributed horizontally.

In one embodiment, a degassing vessel contains a plurality of cones 602a-c distributed horizontally rather than vertically, with the axes of each of the cones 602a-c being substantially parallel, i.e., parallel within 10 degrees. In one embodiment, a master shaft 604 drives slave shafts 606a-c through a gear box 608. Shafts 606a and 606c drive. In one embodiment, slave shafts drive horizontal shafts 610a and 610b through gear boxes 612a and 612b. Shafts 606b, 610a, and 610b cause cones 602a, 602b, and 602c to spin, producing similar effects to those described above. In one embodiment (not shown) at least some of the cones have a different cone angle than one of the cones, such as is shown in FIG. 5.

In one embodiment, the degassing vessel includes a plurality of spinning cones, some distributed vertically and some distributed horizontally.

Figure 7:
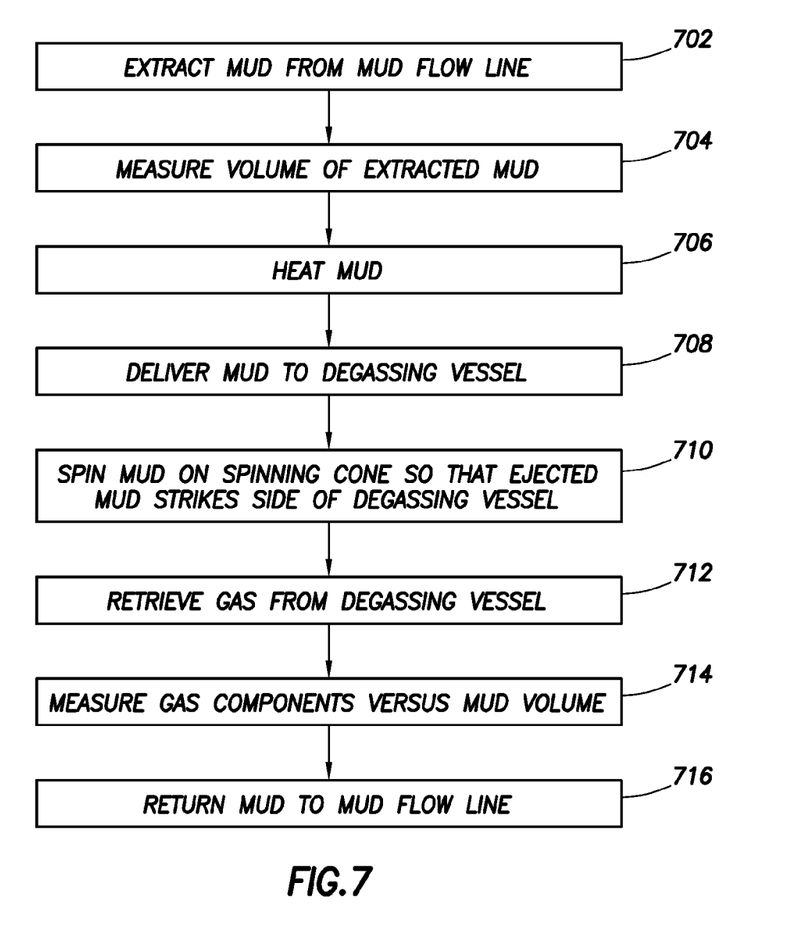
FIG. 7 is a flow chart illustrating a use of the system.

In use, in one embodiment illustrated in FIG. 7, the system extracts mud from the mud flow line (block 702). In one embodiment, the volume of the extracted mud is measured (block 704), for example by the meter 107 shown in FIG. 1. In one embodiment, the mud is heated (block 706), for example by the heater 108 shown in FIG. 1. In one embodiment, the mud is delivered to a degassing vessel (block 708), for example the degassing vessel 202 shown in FIGS. 2A-D or the degassing vessel 402 shown in FIGS. 4 and 5. In one embodiment, the mud is then spun on a spinning cone (e.g. cone 242 in FIGS. 2C-E, cone 245 in FIG. 2F, cone stack 404a-c in FIG. 4, cone stack 502a-c in FIG. 5, or condes 602a-c in FIG. 6) so that ejected mud strikes the side of the degassing vessel (block 710), as shown in FIG. 3, causing gas to be released from the mud as described above. In one embodiment, the gas is retrieved from the degassing vessel (block 712). In one embodiment, components of the gas are measured against the mud volume (block 714). In one embodiment, the mud is returned to the mud flow line (block 716).

The word "couple" as used herein is to be given a broad interpretation. It is intended to include direct or indirect connections.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A degassing system comprising:
   a vessel having a wall;
   a liquid inlet to let liquid into the vessel;
   a liquid outlet to let liquid out of the vessel;
   a liquid receiving chamber, the liquid receiving chamber receiving the liquid that enters the vessel through the liquid inlet, the liquid receiving chamber being open on one side;
   a motor having a shaft;
   a pump coupled to the shaft, the pump having the shape of a cone, the cone having an axis, a narrow end and a wide end;
   the pump positioned so that its narrow end is inserted into the open side of the liquid receiving chamber;
   the pump positioned so that fluid ejected from the wide end when the pump is spinning will strike the wall; and
   a gas outlet for releasing gas from the vessel.

2. The degassing system of claim 1 wherein the pump has the shape of a truncated cone.

3. The degassing system of claim 1 wherein the pump has the shape of a truncated hollow cone.

4. The degassing system of claim 1 further comprising:
   a liquid trap for receiving fluid pumped out of the liquid receiving chamber by the pump;
   the liquid trap in communication with the liquid outlet; and
   the liquid trap preventing gas from escaping from the vessel.

5. The degassing system of claim 1 further comprising;
   a coalescer vessel;
   a gas sample path between the vessel and the coalescer vessel;
   the gas sample path to allow gas to flow from the vessel to the coalescer vessel and liquid coalesced from the gas to flow from the coalescer vessel to the vessel; and
   wherein the gas outlet is coupled to the coalescer vessel.

6. The degassing system of claim 1 further comprising:
   a delivery pump to pump fluid into the vessel through the liquid inlet.

7. The degassing system of claim 1 further comprising:
   a meter to measure the volume of the fluid that flows into the vessel through the liquid inlet.

8. The degassing system of claim 1 further comprising:
   a heater to heat the fluid that flows into the vessel through the liquid inlet.

9. The degassing system of claim 1 further comprising:
   a return pump to pump fluid out of the vessel through the liquid outlet.

10. The degassing system of claim 1 further comprising:
    an analysis subsystem coupled to the gas outlet.

11. The degassing system of claim 1 further comprising:

a sparge gas inlet positioned so that gas introduced through the sparge gas inlet will intersect fluid ejected by the pump.

12. The degassing system of claim 1 further comprising:

a control subsystem to control parameters of the system chosen from the group consisting of motor speed and depth of insertion of the pump into the liquid receiving chamber.

13. The degassing system of claim 1 wherein:

the length of the pump from its wide end to its narrow end is between 80 mm and 110 mm;

an angle between the axis and an outer surface of the pump is between 25 degrees and 35 degrees; and the pump rotates at a speed between 1500 and 2000 revolutions per minute.

14. The degassing system of claim 1 wherein:

the pump rotates at a speed to maintain a fluid level in the liquid receiving chamber between 25 mm and 30 mm above the narrow end of the pump.

15. The degassing system of claim 1 wherein the shape of the cone includes a curved side.

16. A degassing system comprising:

a vessel having a wall;

a liquid inlet to let liquid into the vessel;

a liquid outlet to let liquid out of the vessel;

a liquid receiving chamber, the liquid receiving chamber receiving the liquid that enters the vessel through the liquid inlet, the liquid receiving chamber being open on one side;

a motor having a shaft;

a plurality of pumps coupled to the shaft, each of the plurality of pumps having the shape of a cone, the cone having an axis, a narrow end and a wide end;

each of the plurality of pumps positioned so that its narrow end is inserted into the open side of the liquid receiving chamber;

each of the plurality of pumps positioned so that fluid ejected from the wide end when the pump is spinning will strike the wall; and a gas outlet for releasing gas from the vessel.

17. The degassing system of claim 16 wherein:

the axes of the plurality of pumps are substantially collinear.

18. The degassing system of claim 16 wherein:

the axes of the plurality of pumps are substantially parallel but not collinear.

19. The degassing system of claim 16 wherein:

the axes of some of the plurality of pumps are substantially collinear;

the axes of some of the plurality of pumps are substantially parallel but not collinear.

* * * * *